US010869491B2

(12) United States Patent
Brawn et al.

(10) Patent No.: US 10,869,491 B2
(45) Date of Patent: Dec. 22, 2020

(54) PROCESS FOR MANUFACTURE OF COATED FROZEN CONFECTION

(71) Applicant: Conopco, Inc., Englewood Cliffs, NJ (US)

(72) Inventors: Douglas George Brawn, Rushden (GB); Paul Edward Cheney, Peterborough (GB); Andrew Hoddle, Rushden (GB)

(73) Assignee: Conopco, Inc., Engelwood Cliffs, NJ (US)

( * ) Notice: Subject to any disclaimer, the term of this patent is extended or adjusted under 35 U.S.C. 154(b) by 261 days.

(21) Appl. No.: 15/528,861

(22) PCT Filed: Nov. 26, 2015

(86) PCT No.: PCT/EP2015/077839
§ 371 (c)(1),
(2) Date: May 23, 2017

(87) PCT Pub. No.: WO2016/087318
PCT Pub. Date: Jun. 9, 2016

(65) Prior Publication Data
US 2017/0311622 A1    Nov. 2, 2017

(30) Foreign Application Priority Data

Dec. 2, 2014 (EP) .................................... 14195853
Dec. 2, 2014 (EP) .................................... 14195856

(51) Int. Cl.
*A23G 9/48* (2006.01)
*A23G 1/30* (2006.01)
(Continued)

(52) U.S. Cl.
CPC ............... *A23G 9/48* (2013.01); *A23G 1/305* (2013.01); *A23G 9/04* (2013.01); *A23G 9/245* (2013.01); *A23V 2002/00* (2013.01)

(58) Field of Classification Search
USPC .......................................... 426/89, 100, 101
See application file for complete search history.

(56) References Cited

U.S. PATENT DOCUMENTS

| 2,122,703 A | 7/1938 | Weinreich |
| 2,495,403 A | 1/1950 | Bernards et al. |
(Continued)

FOREIGN PATENT DOCUMENTS

| CN | 1431869 | 7/2003 |
| DE | 2614331 | 10/1976 |
(Continued)

OTHER PUBLICATIONS

Ablett et al., Differential Scanning Calorimetric Study of Frozen Sucrose and Glycerol Solutions, Journal of the Chemical Society, Faraday Transactions, 1992, pp. 789-794, vol. 88 (6).
(Continued)

*Primary Examiner* — Lien T Tran
(74) *Attorney, Agent, or Firm* — Gerard J. McGowan, Jr.

(57) ABSTRACT

The invention relates to a process for the manufacture of a coated frozen confection, the process comprising the steps of (a) manufacturing a frozen confection, followed by; (b) imparting thermal energy to the surface of the frozen confection, sufficient to cause at least partial melting of the surface of the frozen confection, followed by; (c) allowing the surface of the frozen confection to refreeze, followed by; (d) coating the frozen confection in a liquid coating, which subsequently solidifies to provide a solid coating.

18 Claims, 4 Drawing Sheets

(51) Int. Cl.
*A23G 9/24* (2006.01)
*A23G 9/04* (2006.01)

(56) References Cited

U.S. PATENT DOCUMENTS

| | | | |
|---|---|---|---|
| 2,625,120 | A | 1/1953 | Eddy et al. |
| 3,765,188 | A | 10/1973 | Romijn |
| 3,776,671 | A | 12/1973 | Bruschke et al. |
| 3,822,623 | A | 7/1974 | Wight |
| 4,420,496 | A | 12/1983 | Hanson, Jr. et al. |
| 5,209,156 | A | 5/1993 | Lombard |
| 5,454,232 | A | 10/1995 | Lermuzeaux |
| 6,932,994 | B1 | 8/2005 | Gladin et al. |
| 2009/0061059 | A1 | 3/2009 | Jarvis et al. |
| 2009/0081342 | A1 | 3/2009 | Jarvis et al. |
| 2015/0282502 | A1* | 10/2015 | Ummadi ............. A23G 9/32 426/565 |

FOREIGN PATENT DOCUMENTS

| | | |
|---|---|---|
| DE | 19860442 | 12/1999 |
| EP | 1871175 | 1/2008 |
| HU | 52339 | 7/1990 |
| JP | 1128752 | 5/1989 |
| WO | WO2006048190 | 5/2006 |
| WO | WO2006111265 | 10/2006 |
| WO | WO2006111266 | 10/2006 |

OTHER PUBLICATIONS

C. Clarke, Colloidal dispersions, freezing and rheology, The Science of Ice Cream, 2004, pp. 28-30.
IPRP in PCTEP2015077839, Feb. 1, 2017.
Search Report & Written Opinion in PCTEP2015077839, dated Mar. 21, 2016.
Search Report & Written Opinion in PCTEP2015077840, dated Mar. 21, 2016.
Search Report in EP14195853, dated May 8, 2015, EP.
Search Report in EP14195856, dated May 11, 2015.
Written Opinion in EP14195853, dated May 8, 2015, EP.
Written Opinion in EP14195856, dated May 11, 2015.
Search Report and Office action in the Family Chinese Patent Application No. 201580065773.0, with manual translation, dated Jan. 7, 2020.

* cited by examiner

PROCESS FOR MANUFACTURE OF COATED FROZEN CONFECTION

TECHNICAL FIELD OF THE INVENTION

The present invention relates to a process of manufacture of coated frozen confection products.

BACKGROUND TO THE INVENTION

Frozen confections which consist of ice cream, frozen yoghurt, or the like coated with chocolate, frozen fruit juice, or other coatings are popular products. These products are often supported on a stick so that they can be conveniently consumed without being held directly. Chocolate-coated stick products are one example of this type of product that have been known for many years.

Frozen confection products, including those on sticks are often produced by an "extrude and cut" process. This provides an uncoated frozen confection, which may at this stage already include a stick inserted in the confection.

More recently it has been proposed to manufacture frozen aerated products with cold roller apparatus the process comprising providing two rollers with open cavities on their surfaces, filling two cavities, one on each roller, with a frozen aerated material, wherein at least one of the cavities is filled with a frozen aerated product which is then allowed to expand outside its cavity, the two cavities then being moved opposite one another and the frozen aerated product in each cavity is pressed against the frozen aerated product in the other cavity. The product is thus formed from two halves and is self-releasing from the rollers.

Once manufactured, the uncoated frozen confection can then be coated by dipping into a bath of liquid coating to form the coating or they may also be sprayed or enrobed with liquid coating. Once coated, the frozen products are typically blast frozen and moved from the production area to the storage areas in the factory prior to distribution.

However it has been found that, on occasion, unwanted bubbles appear in the liquid coating. Furthermore these bubbles often do not burst due to the high viscosity and/or rapid solidification of the coating, or if they do burst they leave a crater. Thus, undesirable surface imperfections can be present in such solidified coatings due to such bubbles.

It would therefore be desirable to prevent the formation of such bubbles in order to improve the quality of the coating.

SUMMARY OF THE INVENTION

The present inventors have found that such bubbles can still be present even under conditions where gas bubbles are completely eliminated from the liquid coating before applying it to the surface of the frozen confection. It has therefore been concluded that the bubbles are somehow being formed by another mechanism.

After carrying out a study of the phenomenon the inventors have observed that the presence of the bubbles is associated with the surface of the frozen confection having troughs, and possibly also peaks, in the surface of the frozen confection.

Such peaks and troughs may be introduced inadvertently as part of the frozen confection manufacturing process, exhibiting themselves as roughness and imperfections in an otherwise smooth surface.

Without wishing to be bound by theory the present inventors have determined that the bubbles are being caused by the coating being unable to completely fill such troughs in the surface of the frozen confection. This may be due to the already high initial viscosity (especially in the case of a chocolate coating) and/or the typically rapid crystallisation or solidification of the coating before it has had an opportunity to flow into the troughs.

Thus, it is believed that gas is entrapped beneath the surface of the liquid coating where troughs in the surface of the frozen confection existed. Furthermore, it is theorised that such trapped gas expands as it warms due to the heat transfer to the surface of the frozen confection from the applied coating. Thus, following Charles' Law, such a gas will expand as it warms and can then form a bubble in the liquid coating.

The present inventors have furthermore surprisingly found that preventing or removing such troughs and/or peaks in the surface of the frozen confection prior to applying the liquid coating, prevents the formation of the bubbles in the coating.

In particular the inventors have found that applying thermal energy to the surface of the frozen confection sufficient to cause melting of the surface, results in the troughs being filled naturally by the molten frozen confection surface acting under the surface tension forces present in the molten surface.

Accordingly, a first aspect of the present invention relates to a process for the manufacture of a coated frozen confection, the process comprising the steps of
 (a) manufacturing a frozen confection, followed by;
 (b) imparting thermal energy to the surface of the frozen confection, sufficient to cause at least partial melting of the surface of the frozen confection, followed by;
 (c) allowing the surface of the frozen confection to refreeze, followed by;
 (d) coating the frozen confection in a liquid coating, which subsequently solidifies to provide a solid coating.

Thus the invention involves imparting a controlled quantity of thermal energy to the frozen confection. The quantity of thermal energy must not be too low so as not to cause melting of the surface and must not be too high so as to cause bulk melting of the confectionery. Rather, the thermal energy is just sufficient to cause melting of the surface. Typically, melting occurs through a sufficient thickness of the frozen confectionery in order to allow the troughs to naturally be removed. However, it is advantageous that no more thermal energy than is necessary is applied.

Thus, preferably the amount of thermal energy imparted to the surface of the frozen confection is at least 1 $J/cm^2$, more preferably at least 2 $J/cm^2$, yet more preferably at least 5 $J/cm^2$, yet more preferably at least 10 $J/cm^2$, yet more preferably still at least 15 $J/cm^2$, even more preferably at least 20 $J/cm^2$, most preferably at least 25 $J/cm^2$. Preferably the amount of thermal energy imparted to the surface of the frozen confection is at most 500 $J/cm^2$, more preferably at most 400 $J/cm^2$, yet more preferably at most 300 $J/cm^2$, yet more preferably at most 200 $J/cm^2$, yet more preferably still at most 150 $J/cm^2$, even more preferably at most 100 $J/cm^2$, preferably at most 75 $J/cm^2$.

This process is highly counter-intuitive because a person skilled in the art knows that when coating a frozen confectionery with a liquid coating, the surface of the frozen confection needs to be solid. It is therefore highly innovative to take steps to melt the surface of the frozen confection prior to such coating step.

The energy is preferably evenly applied over the surface of the frozen confection in order that there is a substantially constant thickness of the confection which is at least partially melted. However it could be the case that only one side of the frozen confection is heated, particularly if only one side requires smoothing due to the process of manufacture. Typically at least one side of the confection will be heat treated. Thus, preferably at least 30% of the surface area is heat treated.

Although the frozen confection is melted prior to coating, it has been observed that such a molten surface can naturally refreeze prior to applying the liquid coating. This is best achieved simply by allowing the heat applied to the surface to transfer internally into the core of the frozen confection, whereupon the temperature at the surface drops below freezing and resolidification, albeit now with a smooth surface, occurs.

It has been found that it is preferred if the heat is applied in a non-contact manner. Thus typically the frozen confection will not be contained within a mould during step (b).

For example, the heat may be applied by convective means, e.g. a stream of heated air, or by radiative means, e.g. by use of a radiative element.

Although the process can be carried out in a batch, semi-batch or continuous manner, it is preferred to be carried out in a continuous manner. As such it is important for processing efficiency for the step of allowing the surface of the frozen confection to resolidify not to slow down the process by too great an amount of time. Thus, preferably the time taken for step (c) is less than 1 minute, preferably less than 30 seconds, more preferably less than 15 seconds.

Typically, the frozen confection is at a core temperature of from −30° C. to −5° C. immediately prior to imparting thermal energy in step (b), so that it is capable of readily refreezing the surface in step (c).

The present invention applies to any type and kind of troughs in the surface of the frozen confection. It has also been observed that such troughs can be introduced inadvertently when the frozen confection is made by an extrude-and-cut method.

The cut product is placed onto a freezing metal, e.g. stainless steel, surface at a temperature of −15° C. or below, more preferably −25° C. or below, most preferably −30° C. or below. This then passes through a cold, e.g. −40° C., blast freezer. When it leaves the freezer, the ice cream is released from the plate or conveyor. However sometimes the frozen confection fails and leaves behind some frozen confection adhered to the plate or conveyor. This has the effect of introducing roughness involving peaks and troughs in the surface of the frozen confection.

Additionally, such troughs can be inadvertently introduced during the cold roller method of manufacture. In such a process it has been found to produce cracks or fissures in the surface of the frozen confection. Such cracks constitute the troughs according to the present invention. The cavity of the crack defines a volume that will contain gas that can potentially expand and the opening of the crack will define the opening through which the gas may escape.

In general, it has been found that troughs cause the greatest problems for bubble formation when they have a volume of 1.5 to 550 mm$^3$ and have surface openings having a minimum diameter of from 0.05 to 7.5 mm. By minimum diameter is meant the largest notional sphere that would fit through the actual opening.

The present invention provides particular benefits when the surface of the frozen confection has troughs with a volume of at least 2 mm$^3$, more preferably at least 5 mm$^3$, more preferably still at least 10 mm$^3$, yet more preferably at least 25 mm$^3$, even more preferably at least 50 mm$^3$, most preferably at least 100 mm$^3$.

As discussed above, it is believed that the bubbles are formed when entrapped gas leaves the trough and therefore the present invention has particular utility when the troughs have surface openings having a diameter of at least 0.1 mm, more preferably at least 0.25 mm, more preferably still at least 0.5 mm, yet more preferably at least 1 mm, even more preferably at least 1.5 mm, most preferably at least 2.5 mm.

As discussed, the present invention provides coated frozen confections. Coating means any edible material which can be used to form a coating layer on a frozen confection. Coatings may be fat-based, such as chocolate (dark chocolate, white chocolate, milk chocolate), or a chocolate analogue or couverture. The term "chocolate" is not intended to be limited to compositions that can legally be described as chocolate in any particular country but includes any products having the general character of chocolate. It therefore includes chocolate-like materials which are made using fats other than cocoa butter (for example coconut oil). Chocolate usually contains non-fat cocoa solids, but it is not essential that it does so (e.g. white chocolate). The term chocolate analogue means chocolate-like fat-based confectionery compositions made with fats other than cocoa butter (for example cocoa butter equivalents, coconut oil or other vegetable oils). Such chocolate analogues are sometimes known as couvertures. Chocolate analogues need not conform to standardized definitions of chocolate which are used in many countries. In addition to fat and cocoa solids, chocolate and chocolate analogues may contain milk solids, sugar or other sweeteners and flavourings. A fat-based coating may consist essentially of vegetable oil and sugar, together with colours and/or flavours as required.

The coating can also be water-based, such as frozen water ices, fruit juices and fruit purees.

Frozen confection products, including stick based frozen confections, can be coated using various different techniques. The frozen confection can be dipped into liquid coatings for a certain time to form the coating. The most commonly used method of dipping, on an industrial scale, is to hold products upside down by their sticks on an indexing conveyor. The conveyor moves the products, stepwise, toward a dipping bath. When over the bath, the products are pushed down in to the coating, pulled back up and then indexed away by the conveyor. In a simpler and cheaper dipping method, the ice cream products are continuously moved though the bath. The products are initially held upside down by their sticks. They are then rotated into a horizontal position in order to clear the side of the bath. They are then rotated back to the upside down (vertical) position, thereby dipping the ice cream into the coating while the products are moved along the length of the bath. At the end of the bath they are rotated back to the horizontal position to clear the edge of the tank. Finally they are rotated back to the upside down position to allow the coating to set and the excess coating to run-off. As an alternative to dipping, spraying can be used to coat products, in particular stick based products. Enrobing can be used to coat products without sticks. The product is placed on a mesh conveyor belt and passed through a waterfall of coating (known as a curtain) typically formed by pumping liquid coating through an aperture in the form of a horizontal slot. This operation coats the top, front, back and sides of the bar. An air knife may be used to blow off the excess coating, which drains through the mesh conveyor. Finally, the mesh conveyor carries the product into a shallow bath of coating thereby immersing the bottom of the product and coating it.

Coatings are applied to the frozen confection as liquids, but solidify when they are cooled down, for example as a result of contact with the frozen confection. Chocolates have complex solidification behaviour because they contain mixtures of different triglycerides which can crystallize in different forms. For example, cocoa butter can exist in six different crystalline forms (polymorphs). As chocolate solidifies, triglycerides begin to crystallize. Within a few seconds the chocolate becomes dry to the touch and has plastic or leathery texture. Crystallization continues slowly, so that it typically takes several hours or days for the triglycerides to fully crystallize and so that the chocolate reaches its maximum brittleness. Chocolate made from fats other than cocoa butter displays similar behaviour, but typically crystallizes over a narrower temperature range and reaches maximum brittleness more quickly. Similarly, water based coatings freeze to create a lattice work of ice crystals around the frozen confection core. Preferably the coating is chocolate.

As used herein, the term "viscosity" refers to the apparent viscosity, i.e. the shear stress divided by the rate of shear in steady simple-shear flow. For many fluids the apparent viscosity will be a function of both the temperature and shear rate applied to the fluid.

Therefore, the temperature and shear rate are specified herein when referring to the viscosity.

A number of apparatus and geometries can be used to determine viscosity [see "A Handbook of Elementary Rheology", H. A. Barnes. Published by the University of Wales Institute of Non-Newtonian Fluid Mechanics. 2000. ISBN 0-9538032-0-1.] For example, a fluid can be sheared, at a specific temperature, in a concentric cylinder geometry, at various shear rates, (shear rates are derived from rotational speed and geometry factors), and the shear stress can be measured (shear stress is derived from torque and geometry factors).

- For Newtonian fluids, (for example water, sugar solutions, oils), the resulting shear stress vs shear rate relationship is linear, and therefore the viscosity is independent of shear rate.
- For Non-Newtonian fluids, for example chocolate, the shear stress/shear rate relationship is not linear, i.e. the viscosity depends on shear rate and therefore the Apparent Viscosity (shear stress divided by shear rate) can be measured at a given shear rate, which should always be quoted along with the apparent viscosity value. Fortunately it has been found, for many materials, that the shear stress/shear rate relationship can be fitted to a model so that the apparent viscosity can be calculated from a few parameters. An example of this is chocolate where the Casson equation can be applied over the shear rate range 5-60 sec-1, for measurement at 40° C. (see IOCCC 1973/10). In this model, the square root of the shear stress is plotted against the square root of the shear rate and a linear relationship is found, of the form Shear stress$^{0.5}$=Casson yield stress0.5+(Casson viscosity$^{0.5}$×shear rate$^{0.5}$). Thus the viscosity profile of chocolate can be reduced to two parameters, namely Casson Yield Value and Casson Viscosity.

However, for the purposes of the present invention, all viscosities are carried out at a specified temperature (e.g. 40° C.) and at a specified shear rate (e.g. 100 s$^{-1}$)

Thus, preferably, the coating has a viscosity of greater than 0.4 Pas at 40° C. and at a shear rate of 100 s$^{-1}$, more preferably greater than 0.5 Pas, yet more preferably greater than 0.6 Pas. Preferably however the coatings have a viscosity of at most 2.0 Pas at 40° C. and at a shear rate of 100 s$^{-1}$, more preferably at most 1.5 Pas.

The product can be partially coated but in a preferred embodiment it is fully coated. Preferably the product comprises at least 5 g, more preferably at least 10 g, more preferably still at least 15 g, yet more preferably at least 20 g, still more preferably at least 25 g, even more preferably at least 30 g, yet more preferably at least 40 g, most preferably at least 50 g of coating. Preferably the product comprises at most 100 g, more preferably at most 80 g, more preferably still at most 70 g, most preferably at most 60 g of coating.

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", 7th Edition R. T. Marshall, H. D. Goff and R. W. Hartel, Kluwer Academic/Plenum Publishers, New York 2013. The frozen confection of the present invention may be aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\text{volume of frozen aerated product} - \text{volume of premix at ambient temp}}{\text{volume of premix at ambient temp}} \times 100$$

The amount of overrun present in the product will vary depending on the desired product characteristics. In the context of the present invention the level of overrun is typically from 0 to 150%, preferably from 60 to 150%, more preferably from 60 to 100%.

Frozen confection means a confection made by freezing a pasteurised mix of ingredients such as water, fat, sweetener, protein (normally milk proteins), and optionally other ingredients such as emulsifiers, stabilisers, colours and flavours. Frozen confections may be aerated. Frozen confections include ice cream, frozen yoghurt and the like. Preferably the frozen confection is an ice cream.

The present invention typically utilises a frozen confection having at most 20 wt % of total sugars. As used herein the term "sugars" refers exclusively to digestible mono- and di-saccharides. The total sugar content of a frozen confection is thus the sum of all of the digestible mono- and di-saccharides present within the frozen confection, including any lactose from milk solids and any sugars from fruits. In preferred embodiments the frozen confection has at most 17.5 wt %, more preferably at most 15 wt %, more preferably still at most 12.5 wt %, yet more preferably at most 10 wt %, even more preferably at most 7.5 wt %, more preferably at most 6 wt % total sugars. Preferably the frozen confection contains at least 1 wt %, more preferably at least 2 wt %, more preferably still at least 5 wt % total sugars.

The frozen confection further typically contains stabilisers, the primary purposes of which is to produce smoothness in body and texture, retard or reduce ice and lactose crystal growth during storage, and to provide uniformity of product and resistance to melting. Additionally, they stabilize the mix to prevent wheying off, produce a stable foam with easy cut-off in the freezer, and slow down moisture migration from the product to the package or the air. The action of stabilisers in ice cream results from their ability to form gel-like structures in water and to hold free water. Iciness can be controlled by stabilizers due to a reduction in the growth of ice crystals over time, related to a reduction in water mobility as water is entrapped by their entangled network structures in the serum phase. Suitable stabilisers include one or more of tara gum, guar gum, locust been gum, carrageenan, gelatin, alginate, carboxymethyl cellulose, xanthan and pectin. The frozen confection contains at least 0.45 wt %, preferably at least 0.5 wt %, more preferably at least 0.55 wt %, more preferably still at least 0.6 wt %, even more preferably at least 0.75 wt %, yet more preferably at least 1.0 wt %, still more preferably at least 2.0 wt %, most preferably at least 5.0 wt % of stabilisers. Preferably the frozen confection contains at most 20 wt %, more preferably at most 15 wt %, more preferably still at most 12.5 wt %, even more preferably at most 10 wt %, most preferably at most 7.5 wt % of stabilisers.

The frozen confection also may contain non-saccharide sweetener which as defined herein consist of: The intense sweeteners aspartame, saccharin, acesulfame K, alitame, thaumatin, cyclamate, glycyrrhizin, stevioside, neohesperidine, sucralose, monellin and neotame; and The sugar alcohols HSH (hydrogenated starch hydrosylate—also known as polyglycitol), eythritol, arabitol, glycerol, xylitol, sorbitol, mannitol, lactitol, maltitol, isomalt, and palatinit. The frozen confection contains at least 0.01 wt % of a non-saccharide sweetener, preferably at least 0.02 wt %, more preferably at least 0.03 wt %, more preferably still at least 0.04 wt %, yet more preferably at least 0.05 wt %, yet more preferably still at least 0.10 wt %, even more preferably at least 0.15 wt %, yet more preferably at least 0.20 wt %, more preferably at least 0.25 wt %, most preferably at least 0.50 wt % of a non-saccharide sweetener. Preferably the frozen confection contains at most 2.5 wt %, more preferably at most 2 wt %, more preferably still at most 1 wt % of a non-saccharide sweetener.

Preferably the product comprises at least 30 g, more preferably at least 40 g, more preferably still at least 50 g, yet more preferably at least 60 g, yet more preferably still at least 70 g, even more preferably at least 80 g, more preferably at least 100 g, yet more preferably at least 125 g, still more preferably at least 150 g, even more preferably at least 200 g frozen confection. Preferably the product comprises at most 500 g, more preferably at most 350 g, more preferably still at most 300 g, still more preferably at most 250 g, most preferably at most 225 g frozen confection.

Preferably, the ice content of the frozen confection at −12° C. is at least 40 wt %, more preferably at least 45 wt %, more preferably still at least 50%, yet more preferably at least 55 wt %, most preferably at least 60 wt %. Preferably the ice content of the frozen confection at −12° C. is at most 70 wt %, more preferably at most 65 wt %, most preferably at most 60 wt %.

Preferably, the ice content of the frozen confection at −8° C. is at least 40 wt %, more preferably at least 45 wt %, more preferably still at least 50%, yet more preferably at least 55 wt %, most preferably at least 60 wt %. Preferably the ice content of the frozen confection at −8° C. is at most 70 wt %, more preferably at most 65 wt %, most preferably at most 60 wt %.

As can be seen from the foregoing the present invention allows for the prevention of bubbles in the coating of a coated frozen confection. Accordingly in a further aspect the invention provides a process according to the first aspect for the prevention of bubbles in the coating of a coated frozen confection. In another aspect the invention provides the use of the process of the first aspect for the prevention of bubbles in the coating of a coated frozen confection.

EXAMPLES

Example 1

Radiative Heat

Smooth Surface

Figure 1A:
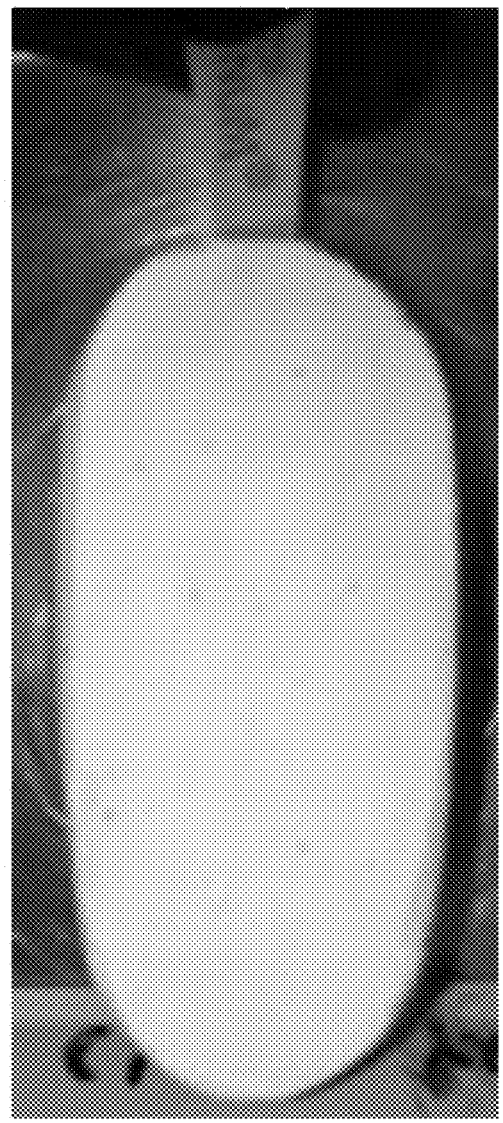
FIG. 1A is a photograph of an ice cream product with an apparently smooth surface prior to being coated.

An ice cream of a conventional formula was carefully produced by extrusion in known manner and cut into frozen confection portions of such a size and dimension as a commercially available consumer ice cream product. An image of the produced ice cream is shown in FIG. 1A.

The produced ice cream had an essentially smooth surface with no observable troughs in the surface. The ice cream was then subsequently dipped into a molten chocolate coating at 46° C. and removed to allow the coating to crystallise as its heat was drawn into the body of the frozen ice cream.

Figure 1B:
FIG. 1B is a photograph of the ice cream product of FIG. 1A after it has been coated in chocolate.

An image of the coated ice cream is shown in FIG. 1B. The resulting coated ice cream produced a largely smooth chocolate surface. However, even when the production of the ice cream core is carefully controlled, bubbles may still form as evidenced by FIG. 1B in which a bubble has formed and caused an imperfection on the coating as can be observed on upper part of the product on the left hand side.

Rough Surface

Figure 2A:
FIG. 2A is a photograph of an ice cream product prior to being coated and has an induced series of troughs.

To introduce the effect of roughness to the surface in a controlled and repeatable manner, approximately 700 holes were introduced into the surface of the frozen confectionery each with a diameter of about 0.3mm and depths of up to 5.5 mm, by applying a wire brush to the surface of the ice cream. An image of the produced ice cream is shown in FIG. 2A.

The frozen confectioneries were then dipped in liquid nitrogen and left to warm at room temperature to allow any liquid nitrogen that entered the holes to vaporise. This was to simulate the nitrogen atmospheric conditions the frozen confectioneries would typically be subjected to during manufacture, and to ensure that nitrogen gas had filled the troughs.

Figure 2B:
FIG. 2B is a photograph of the ice cream product of FIG. 2A after it has been coated in chocolate.

The frozen confectioneries were then dipped into a chocolate coating at 46° C. and withdrawn, allowing the chocolate coating to crystallise as its heat was drawn into the body of the frozen ice cream. Bubbles could be seen to form in the liquid chocolate coating as it began to cool before solidifying, giving the appearance of a low quality product. An image of the coated ice cream is shown in FIG. 2B.

As the liquid chocolate crystallised, numerous bubbles were seen to appear in the coating of chocolate, giving the appearance of a low quality product.

Thermally Treated Surface—radiative Heat

To introduce the effect of roughness to the surface in a controlled and repeatable manner, approximately 700 holes were again introduced into the surface of the frozen confectionery each with a diameter of about 0.3 mm and depths of up to 5.5 mm, by applying a wire brush to the surface of the ice cream.

Figure 3A:
FIG. 3A is a photograph of an ice cream product prior to being coated and has an induced series of troughs and has been thermally treated.

The surface that was roughened was then heat treated by suspending the roughened surface 5 cm above a hot plate at a temperature of 250° C. for 108 seconds. An image of the thermally treated ice cream is shown in FIG. 3A.

The area of the roughened surface was 38 cm². Assuming a thermal conductivity of air=0.024 W/m/° C. at a rate given by $k \cdot A \cdot (T_1 - T_2)/d$, gave thermal transfer rate of 0.5016 W. Carried out over 108 seconds translates into 54.2 J. This is therefore 1.43 J/cm2 applied to the roughened face.

The thermally treated ice cream was then dipped in liquid nitrogen and left to warm at room temperature.

Figure 3B:
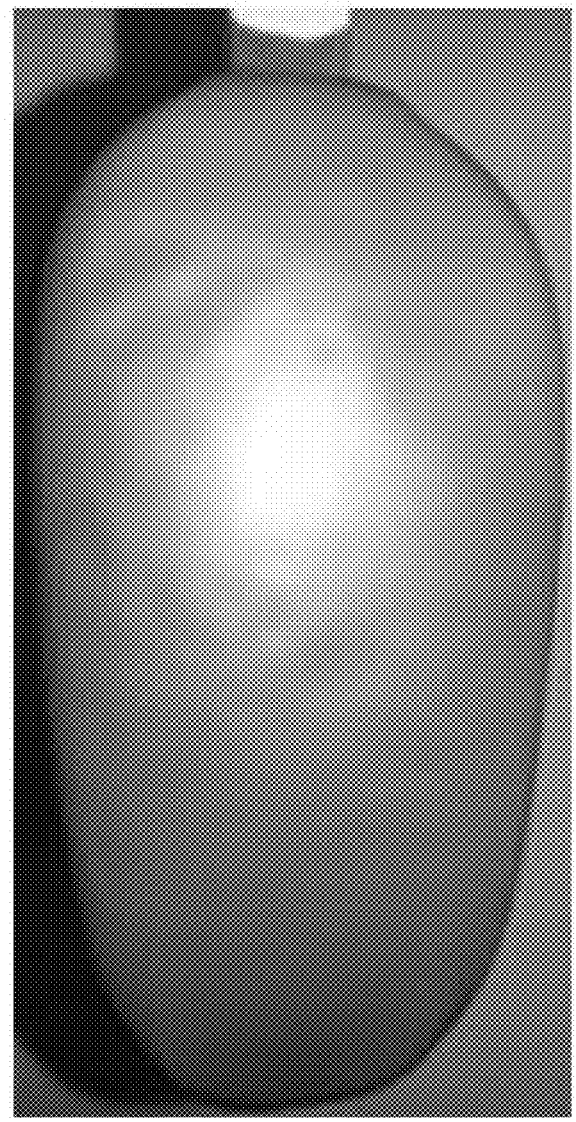
FIG. 3B is a photograph of the ice cream product of FIG. 3A after it has been coated in chocolate.
Figure 4A:
FIG. 4A is a photograph of an ice cream product prior to being coated and has an induced series of troughs and has been thermally treated.

The ice cream was then dipped into a chocolate coating at 46° C. and withdrawn, allowing the chocolate coating to crystallise as its heat was drawn into the body of the frozen ice cream. No bubbles could be seen to form in the liquid chocolate coating as it began to cool before solidifying. An image of the coated ice cream is shown in FIG. 3B.

held on the product surface for 5 seconds to give a thermal transfer of 52.5 J/cm². An image of the thermally treated ice cream is shown in FIG. 4A.

The thermally treated ice cream was then dipped in liquid nitrogen and left to warm at room temperature.

Figure 4B:
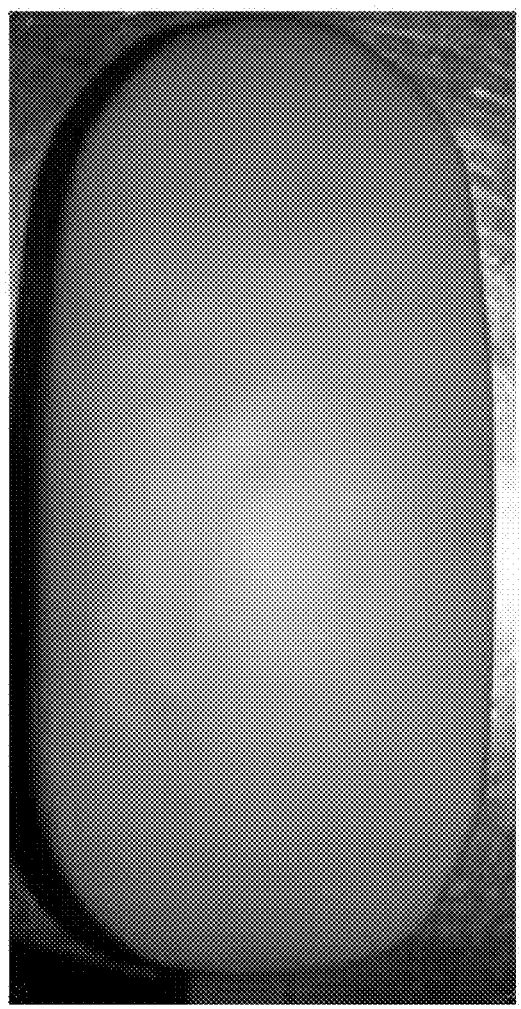
FIG. 4B is a photograph of the ice cream product of FIG. 3A after it has been coated in chocolate.

The ice cream was then dipped into a chocolate coating at 46° C. and withdrawn, allowing the chocolate coating to crystallise as its heat was drawn into the body of the frozen ice cream. No bubbles could be seen to form in the liquid chocolate coating as it began to cool before solidifying. An image of the coated ice cream is shown in FIG. 4B.

It can thus again be seen that this alternative approach of thermally treating the ice creams with a controlled quantity of heat prior to being coated in chocolate again prevents the bubbles from forming.

Example 3

Generation of Bubbles

In order to more accurately understand the nature of the troughs which give rise to the formation of bubbles, experiments were carried out. This involved intentionally inducing troughs (referred to as "recesses") of various dimensions to understand the conditions under which bubbles are formed.

Stick-based ice cream blanks (i.e. uncoated frozen confections) were provided. They were removed from a freezer at a temperature of −25° C. and punching tools such as pins or nails were used to created cylindrical recesses of varying widths (Diameters of 0.6, 1, 2, 3.7, 5, 6.8, 8.3, and 12.8 mm) and of varying depths (Depths of 1, 2, 3, 4, 5, 10, 15 mm). Volumes of the recesses in mm³ were calculated using the formula: Pi×(radius)²×(height) and are shown in Table 1. For each volume, recesses were created in triplicate.

TABLE 1

Volumes of recesses for a given depth and diameter.

| | | Diameter of recess (mm) | | | | | | | |
|---|---|---|---|---|---|---|---|---|---|
| | | 0.6 | 1 | 2 | 3.7 | 5 | 6.8 | 8.3 | 12.8 |
| Depth of recess (mm) | 1 | 0.28 | 0.79 | 3.14 | 10.75 | No recesses with these dimensions were created | | | |
| | 2 | 0.57 | 1.57 | 6.28 | 21.50 | | | | |
| | 3 | 0.85 | 2.36 | 9.42 | 32.26 | | | | |
| | 4 | 1.13 | 3.14 | 12.57 | 43.01 | | | | |
| | 5 | 1.41 | 3.93 | 15.71 | 53.76 | 98.17 | 181.58 | 270.53 | 643.40 |
| | 10 | 2.83 | 7.85 | 31.42 | 107.52 | 196.35 | 363.17 | 541.06 | 1286.80 |
| | 15 | 4.24 | 11.78 | 47.12 | 161.28 | 294.52 | 544.75 | 811.59 | 1930.19 |

It can thus be seen that the introduction of troughs representing surface roughness cause bubbles to appear on the surface of the ice creams when it is coated in chocolate. Furthermore, thermally treating the ice creams with a controlled quantity of heat prior to being coated in chocolate prevents the bubbles from forming.

Example 2

Conductive Heat

Thermally Treated Surface—conductive Heat

To introduce the effect of roughness to the surface in a controlled and repeatable manner, approximately 700 holes were again introduced into the surface of a frozen confectionery each with a diameter of about 0.3 mm and depths of up to 5.5 mm, by applying a wire brush to the surface of the ice cream.

The surface that was roughened was then heat treated by contacting it with a stainless steel block at 20° C. which was Following the creation of the recesses, the products were dipped in liquid nitrogen for 7 seconds, then left at ambient temperature for approximately 20 seconds after which they were dipped into a chocolate coating at 3 different temperatures (36° C., 46° C., and 56° C.)

Each recess volume and opening diameter was assessed for its propensity to form a bubble. They were given the following scores:

0%: No bubble formed

33%: 1 of the triplicate recesses formed a bubble

66%: 2 of the triplicate recesses formed a bubble

100%: All 3 of the triplicate recesses formed a bubble

The scores are shown in Table 2 from which is can be seen that recesses having a volume of from 1.5 to 550 mm³ and an opening of diameter from 0.05 to 7.5 mm consistently produced bubbles in the coating.

TABLE 2

Scores showing propensity of recesses of a given volume and openings having a given diameter to form bubbles in coatings at various temperatures.

| Temperature of coating | Recess depth (mm) | Diameter of recess (mm) | | | | | | | |
|---|---|---|---|---|---|---|---|---|---|
| | | 0.6 | 1 | 2 | 3.7 | 5 | 6.8 | 8.3 | 12.8 |
| 36° C. | 1 | 0% | 0% | 33% | 0% | No recesses with these dimensions were created | | | |
| | 2 | 0% | 0% | 33% | 67% | | | | |
| | 3 | 0% | 0% | 33% | 33% | | | | |
| | 4 | 0% | 0% | 33% | 33% | | | | |
| | 5 | 33% | 0% | 67% | 67% | | | | |
| | 10 | 67% | 67% | 100% | 100% | | | | |
| | 15 | 100% | 33% | 100% | 100% | | | | |
| 46° C. | 1 | 0% | 33% | 33% | 0% | No recesses with these dimensions were created | | | |
| | 2 | 33% | 33% | 33% | 33% | | | | |
| | 3 | 33% | 0% | 0% | 0% | | | | |
| | 4 | 0% | 67% | 33% | 33% | | | | |
| | 5 | 0% | 67% | 100% | 33% | | | | |
| | 10 | 33% | 67% | 100% | 100% | | | | |
| | 15 | 100% | 100% | 100% | 67% | | | | |
| 56° C. | 1 | 0% | 0% | 0% | 67% | No recesses with these dimensions were created | | | |
| | 2 | 33% | 0% | 33% | 67% | | | | |
| | 3 | 33% | 33% | 100% | 100% | | | | |
| | 4 | 0% | 67% | 33% | 100% | | | | |
| | 5 | 67% | 67% | 100% | 100% | 100% | 0% | 0% | 0% |
| | 10 | 67% | 100% | 100% | 100% | 100% | 67% | 0% | 0% |
| | 15 | 100% | 100% | 100% | 100% | 100% | 67% | 0% | 0% |

The invention claimed is:

1. A process for the manufacture of a coated frozen confection, the process comprising the steps of
    a) manufacturing a frozen confection, followed by;
    b) imparting thermal energy to the surface of the frozen confection, sufficient to cause at least partial melting of the surface of the frozen confection, followed by;
    c) allowing the surface of the frozen confection to refreeze, followed by;
    d) coating the frozen confection in a liquid coating, which subsequently solidifies to provide a solid coating; characterised in that the thermal energy imparted in step b) is imparted by convective means or by radiative means.

2. A process according to claim 1 wherein, the amount of thermal energy imparted to the surface of the frozen confection is from 1 to 500 J/cm$^2$.

3. A process according to claim 1, wherein the thermal energy is evenly applied over the surface of the frozen confection in step (b).

4. A process according to claim 1, wherein the frozen confection is not contained within a mould during step (b).

5. A process according to claim 1 wherein the frozen confection is at a core temperature of from −30° C. to −5° C. immediately prior to imparting thermal energy in step (b).

6. A process according to claim 1, wherein the surface of the frozen confection prior to step (b) has troughs with a volume of 1.5 to 550 mm$^3$ and surface openings having a minimum diameter of from 0.05 to 7.5 mm.

7. A process according to claim 1, wherein the frozen confection is manufactured by extrusion and cutting the extruded product.

8. A process according to claim 7, wherein the cut product is placed onto a freezing surface at a temperature of −15° C. or below.

9. A process according to claim 8, wherein the freezing surface is made of a metal.

10. A process according to claim 9, wherein the freezing surface is a stainless steel platform.

11. A process according to claim 1, wherein the coating is chocolate.

12. The process according to claim 9 wherein the metal is stainless steel or aluminum.

13. The process according to claim 10 wherein the stainless steel platform is arranged to carry the frozen confectionery through a freezer.

14. The process according to claim 13 wherein the freezer comprises a blast freezer.

15. The process according to claim 2 wherein the amount of thermal energy imparted to the surface of the frozen confection is from 2 to 400 J/cm$^2$.

16. The process according to claim 2 wherein the amount of thermal energy imparted to the surface of the frozen confection is from 5 to 300 J/cm$^2$.

17. The process according to claim 8, wherein the cut product is placed onto a freezing surface at a temperature of −25° C. or below.

18. The process according to claim 17, wherein the cut product is placed onto a freezing surface at a temperature of −30° C. or below.

* * * * *